US005587531A

United States Patent [19]

Kawakami et al.

[11] Patent Number: 5,587,531

[45] Date of Patent: Dec. 24, 1996

[54] SEMICONDUCTOR STRAIN GAUGE ACCELERATION SENSOR

[75] Inventors: Takahiro Kawakami; Akira Ogawa; Etsuo Ichimura, all of Omiya, Japan

[73] Assignee: Kansei Corporation, Omiya, Japan

[21] Appl. No.: 501,174

[22] Filed: Jul. 11, 1995

[51] Int. Cl.$^6$ .......... G01P 15/12

[52] U.S. Cl. .......... 73/514.12; 73/522

[58] Field of Search .......... 73/514.12, 522, 73/514.05, 514.33, 514.36, 514.37

[56] References Cited

U.S. PATENT DOCUMENTS 3,065,639 11/1962 Stedman .......... 3/514.12
4,967,597 11/1990 Yamada et al. .......... 73/514.12

FOREIGN PATENT DOCUMENTS 4-181170 6/1992 Japan .

*Primary Examiner*—John E. Chapman
*Attorney, Agent, or Firm*—Jacobson, Price, Holman & Stern, PLLC

[57] ABSTRACT

An acceleration sensor includes an acceleration detecting element (15) for detecting an acceleration in a sealed case (11), silicon oil (16) with which the case (11) is filled for giving damping to the acceleration detecting element (15), and a deformable sealed enclosure (20) which is mounted in the case (11) and is filled with gas. A change in volume of the silicon oil (16) caused by a change in temperature of the silicon oil (16) is counteracted by the deformation of the sealed enclosure (20). The deformation of the sealed enclosure may include variations in the height and pitch of wave shapes defined by a diaphragm portion of the sealed enclosure.

9 Claims, 4 Drawing Sheets

21
11a
15
B'
16
15a
G
20
34
33
30
11
C1
18
12
18
14
15b
13
17
17
17

25
24
22
21
23
20
35
33
31
37
34
30
32
36
35 h
23
22
24
$P_1$
$h_1$
$P_2$
$h_2$
$P_3$
$h_3$
$P_4$
$h_4$
R
$P_5$
$h_5$
$P_6$
$h_6$ 24
25
21
22A
40
32A
31
33A
40
40
36
40
30

SEMICONDUCTOR STRAIN GAUGE ACCELERATION SENSOR

BACKGROUND OF THE INVENTION

1. Field of the Invention

The present invention relates to an acceleration sensor in which an acceleration detecting element and a liquid for giving damping to the acceleration detecting element are enclosed in a case.

2. Description of the Prior Art

Heretofore, an acceleration sensor for detecting the acceleration of a vehicle is known as shown in FIG. 6.

In FIG. 6, reference numeral 1 is a metallic case which is welded to a base 2. The case 1 is sealed airtightly. In the case 1, a ceramic board 3 is fixed to the base 2. A membrane resistance and the like are formed on the ceramic board 3. A semiconductor acceleration detecting element 5 for detecting acceleration is mounted on the ceramic board 3 with a silicon pedestal 4 therebetween. The semiconductor acceleration detecting element 5 is supported at only one end.

Further, in the case 1, silicon oil 6 is contained for giving damping to the acceleration detecting element 5, and a sponge 7 is mounted for absorbing the thermal expansion or contraction of the silicon oil 6 so as to avoid an accident such as leakage of the silicon oil 6. Reference numeral 8 is an adhesive substance with which the sponge 7 is caused to adhere to the case 1.

A strain gauge portion **5*a* is formed in the acceleration detecting element 5. A free end portion 5*b* of the strain gauge portion 5*a* is rocked in the direction of an arrow A, so that the strain gauge portion 5*a* is distorted. This distortion causes a change in a resistance value of the strain gauge portion 5*a***. Based on the change in the resistance value, the acceleration, which is applied in the direction of the arrow A, is detected.

Since the sponge 7 mounted in the conventional acceleration sensor is arranged so as to compensate for the thermal expansion or contraction of the silicon oil 6, there are instances where the sponge 7 cannot act according to the contraction of the silicon oil 6 in a low temperature. As a result, gas within the sponge 7 leaks and generates bubbles in the silicon oil 6. If the bubbles adhere to the surface of the free end portion **5*b* of the acceleration detecting element 5, friction characteristics are changed between the acceleration detecting element 5 and the silicon oil 6. Thereby, the amount of rocking of the free end portion 5*b* of the acceleration detecting element 5 is changed. Accordingly, the amount of distortion of the strain gauge portion 5*a* is changed and thereby the output characteristics of the detecting element 5** are fluctuated. Therefore, disadvantageously, an accurate acceleration cannot be detected.

SUMMARY OF THE INVENTION

It is, therefore, an object of the present invention to provide an acceleration sensor in which no bubble is generated in a liquid enclosed in a case.

DESCRIPTION OF THE PREFERRED EMBODIMENTS

Embodiments of an acceleration sensor according to the present invention will be described hereinafter with reference to the accompanying drawings.

Figure 1:
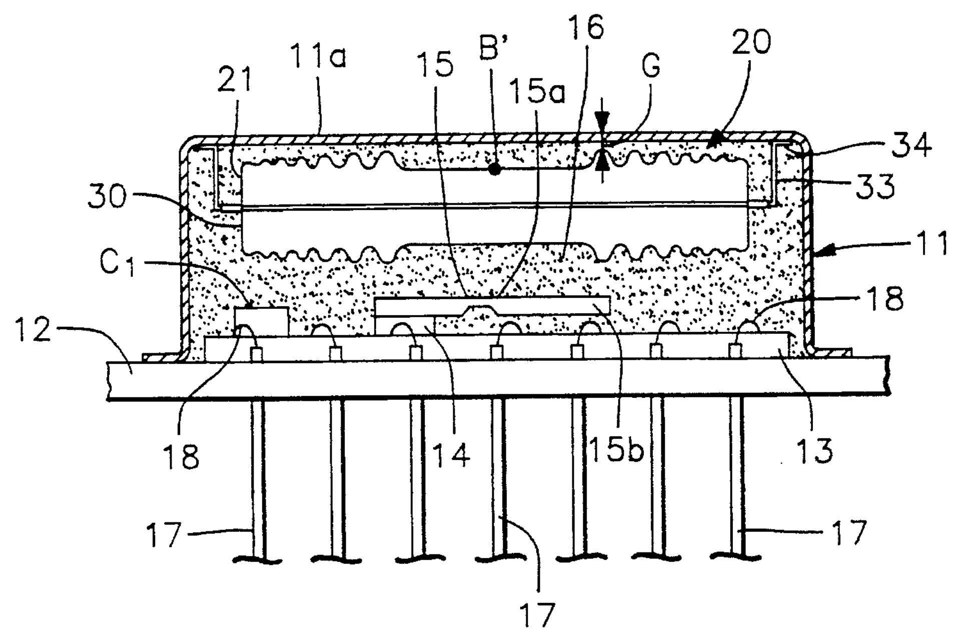
FIG. 1 is a schematic sectional view showing a constitution of an acceleration sensor according to the present invention.

In FIG. 1, reference numeral 11 is a metallic case one end of which is enclosed by a plate **11*a* and the other end is opened. The case 11 is welded to a base 12 with which the opening of the case 11 is closed. The case 11** is tightly sealed.

In the case 11, a ceramic board 13 is fixed to the base 12. A hybrid IC circuit (not shown) is formed on the ceramic board 13. A tantalum condenser C1 and a ceramic condenser (not shown) are disposed on the ceramic board 13.

Further, a semiconductor acceleration detecting element 15 for detecting an acceleration is mounted on the ceramic board 13 with a silicon pedestal 14 therebetween. The semiconductor acceleration detecting element 15 is supported at only one end.

A strain gauge portion **15*a* is formed in the acceleration detecting element 15. When a free end portion 15*b* of the acceleration detecting element 15 receives an acceleration, the free end portion 15*b* is rocked in an up-and-down direction in FIG. 1 and thereby the strain gauge portion 15*a* is distorted. Based on a change in a resistance value of the strain gauge portion 15*a*** caused by the distortion, the acceleration is detected.

The case 11 is filled with silicon oil (liquid) 16 for damping the rocking of the acceleration detecting element 15.

In FIG. 1, reference numeral 17 is lead-chain-pins and reference numeral 18 is cables connected to the hybrid IC circuit of the ceramic board 13.

Figure 2:
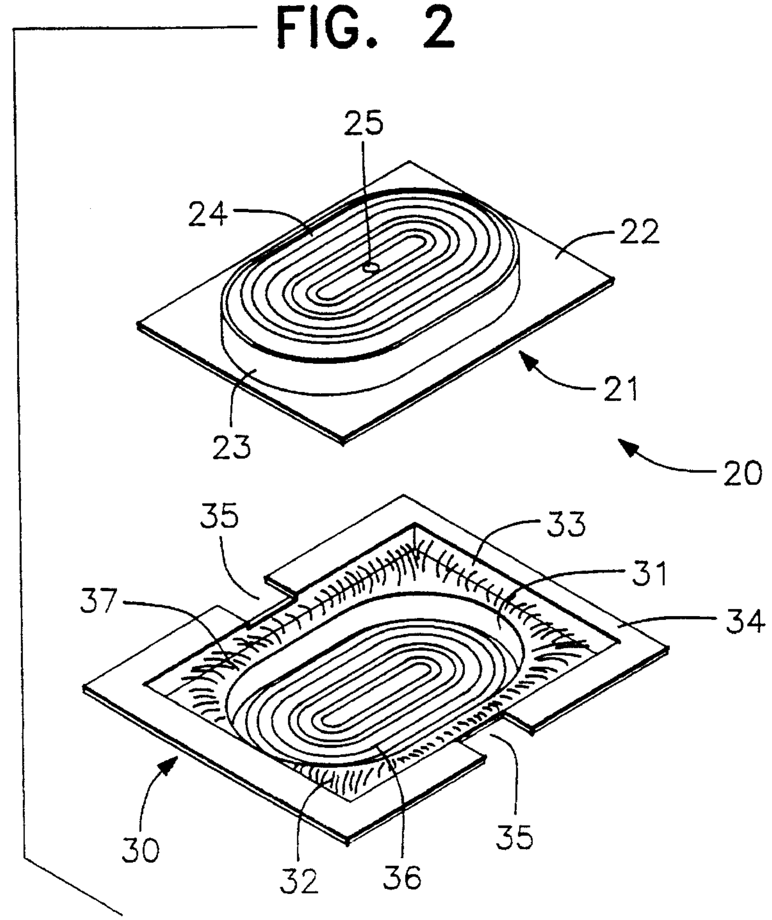
FIG. 2 is an exploded and perspective view showing a constitution of a sealed enclosure of the acceleration sensor of FIG. 1.

Moreover, in the case 11, a deformable sealed enclosure 20 is mounted for keeping the volume of the case 11 constant. As shown in FIG. 2, the deformable sealed enclosure 20 consists of a first metallic case body 21 and a second metallic case body 30. Both the surfaces of the first and second case bodies 20, 21 are formed by beryllium copper plated with nickel.

Figure 3:
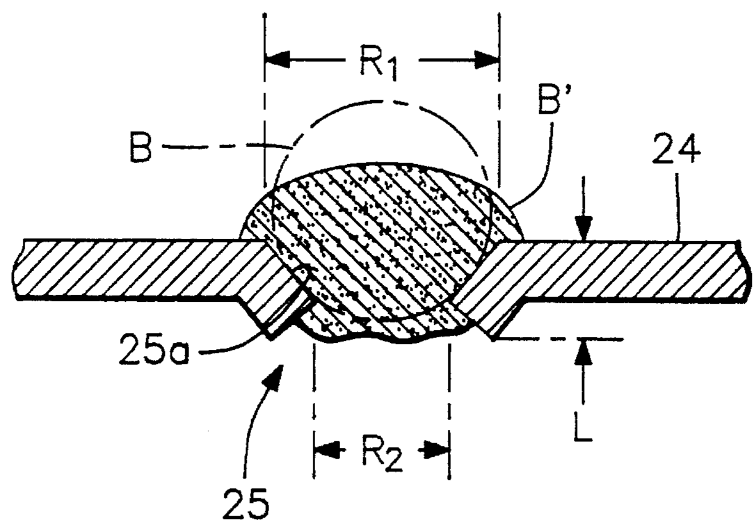
FIG. 3 is a fragmentary and expanded sectional view of a small hole formed in the middle of the sealed enclosure.
Figure 6:
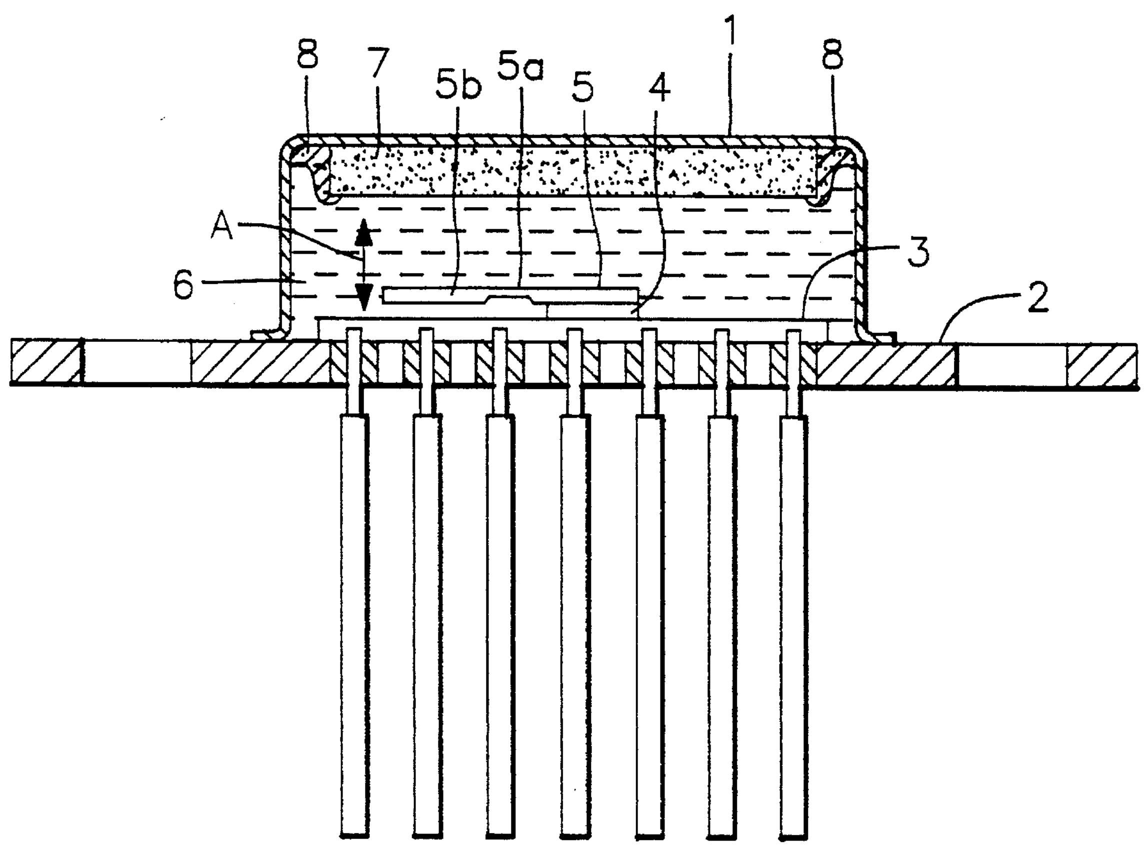
FIG. 6 is a schematic sectional view showing a constitution of a conventional acceleration sensor.

The first case body 21 comprises a container 23 (first container) of which the bottom portion is opened, and a flange 22 (first flange) which is mounted around the bottom opening of the container 23. A diaphragm portion 24 variable in shape is formed on the top surface, on which pressure is applied, of the container 23. In the middle of the diaphragm portion 24, as shown in FIG. 3, a hole 25 is formed for adjusting pressure within the sealed enclosure 20.

When the first case body 21 is united to the second case body 30 by soldering, the hole 25 serves as a leak through which air expanded within the sealed enclosure 20 escapes.

Moreover, the hole 25 serves to prevent the cracking of a soldered portion (caused when an inner pressure of the sealed enclosure 20 decreases and thereby air streams thereinto from the outside) and prevent the generating of pin holes when the temperature within the sealed enclosure 20 returns to an ordinary temperature.

The more the hole 25 goes down, the smaller its diameter is. The inner surface 25$a$ of the hole 25 has a tapered shaped. The top diameter R1 of the hole 25 is set about 0.8 mm, the bottom diameter R2 thereof is set about 0.5 mm, and the height L thereof is set about 0.3 mm.

Because of the taper of the hole 25, sealing operations of the hole 25 can be carried out by putting a soldering ball B thereon as shown by the alternate long and short dash line of FIG. 3, and therefore the productive efficiency can be raised. Further, because of the sealing operations by using the soldering ball B, in a soldering process of the hole 25, the sealing operations can be carried out while the lower half-portion of the sealed enclosure 20 is soaked in water. For this reason, a change in pressure within the sealed enclosure 20 caused by an increase in temperature therein can be prevented and therefore the quality of the sealed enclosure 20 can be raised. In FIG. 3, reference sign B' shows a state in which the soldering ball B is heated and closes the hole 25.

Figure 4:
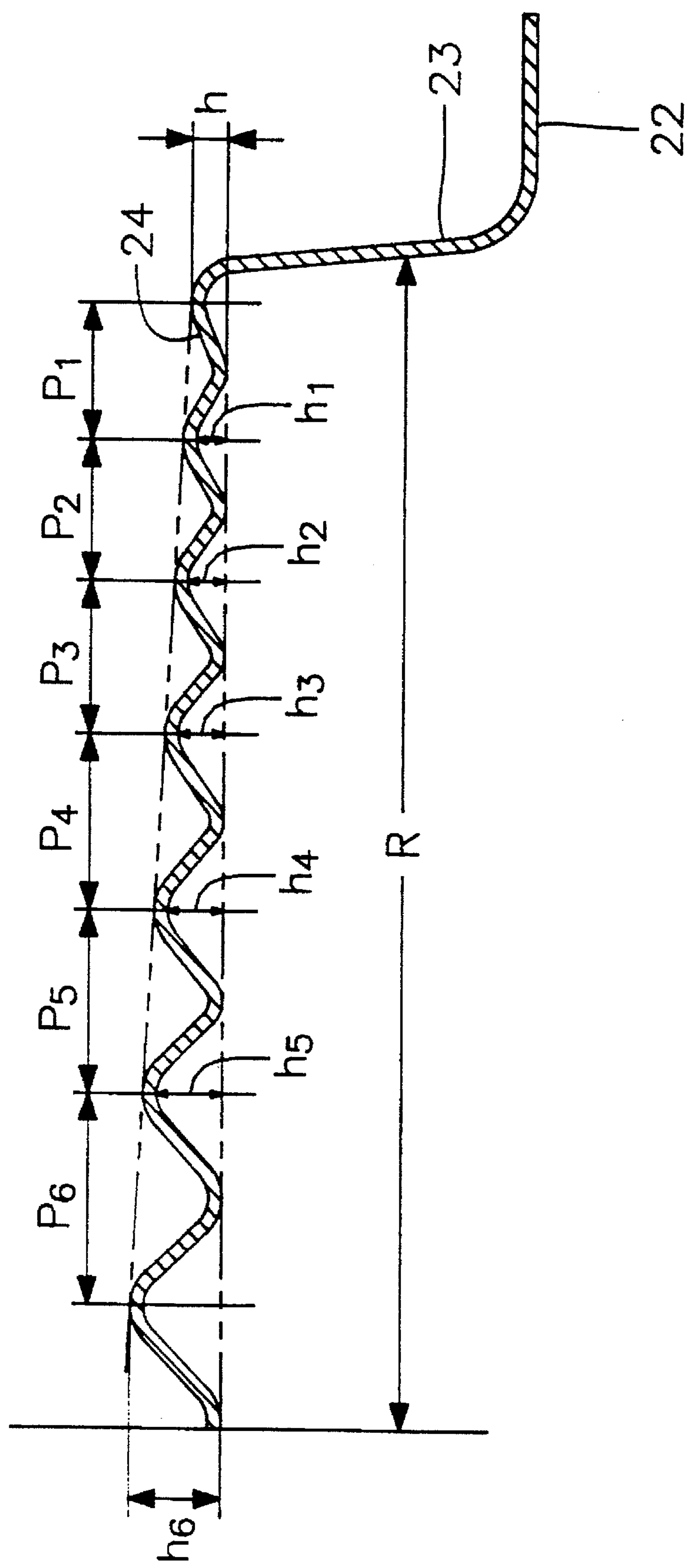
FIG. 4 is a sectional view showing a part of the diaphragm portion of the sealed enclosure.

As shown in FIG. 4, the diaphragm portion 24 extends in waves from the center to the peripheral part thereof. The heights (h1~h6) and pitches (P1~P6) of the waves are set to become smaller gradually toward the outside. By this arrangement, a spring constant of the center part becomes small and therefore the center part can be significantly displaced. That is, even if the sealed enclosure 20 is small, its volume can be changed significantly. Therefore, the acceleration sensor can be made compact.

In FIG. 4, a pitch Pn between two adjacent wave crests is $$Pn=P1\times Xp^{n-1}$$

where P1 is an initial value and Xp is a series magnification.

If a line joining all the wave crests is set to be a direct line, a magnification Xh of a wave height is $$Xh=h6/h1$$

In this connection, a simulation was carried out to obtain a value in which a stress distribution of the diaphragm portion 24 becomes even and a displacement of the center of the diaphragm portion 24 becomes maximum under the conditions mentioned above. The result was Xp=1.1

P1=0.534

Xh=3 h1=0.15

(an allowable error range is within±30%, namely, Xp=1.1±30%, P1=0.534±30%, Xh=3±30%, and h1=0.15±30%).

This indicates that the stress distribution of the diaphragm portion 24 is even, namely, indicates that each part of the diaphragm portion 24 is deformed elastically. Therefore, the stress concentration in specified parts of the diaphragm portion 24 in prevented from causing breaks or cracks thereof.

If the displacement of the diaphragm portion 24 is small, for example, if only the peripheral part of the diaphragm portion 24 is deformed elastically, the displacement of the center of the diaphragm portion 24 is small because the other parts are not elastically deformed. As a result, the stress is concentrated in the peripheral part. (Considering the center and a part in close vicinity of the center, the center is not elastically deformed with respect to the part near the center. For this reason, no stress is generated at the boundary between the center and the part near the center.) Therefore, breaks or cracks are caused in the peripheral part.

The even stress distribution enables the displacement of the center of the diaphragm portion 24 to be maximum. For this reason, without enlarging the first case body 21, the displacement of the diaphragm portion 24 can be ensured sufficiently. In other words, even if the sealed enclosure 20 is small, a great change in volume can be brought about and, therefore, the acceleration sensor can be made compact and, in addition, a range of a working temperature can be widened.

Referring again to FIG. 2, the second case body 30 comprises a container 31 of which the top portion (other end) is opened, a flange 32 (second flange) mounted around the opening of the container 31 and united to the flange 22 of the first case body 21, a peripheral wall 33 which extends toward the first case body 21 and encloses the outer periphery of the flange 32, and a flange 34 which extends toward the outside of the top end of the outer periphery 33. A cutout 35 is formed in the flange 34 as occasion arises. The flange 22 of the first case body 21 can be fitted in the peripheral wall 33.

The height of the peripheral wall 33 is set taller than that of the container 22 of the first case body 21 so that a gap G is formed with a predetermined width between the diaphragm portion 24 and the case 11 when the sealed enclosure 20 is mounted within the case 11.

In the bottom portion, on which pressure is applied, of the container 31, a deformable diaphragm portion 36 is formed which extends in waves from the center to the peripheral part thereof as in the the diaphragm portion 24. The wave heights and pitches of the diaphragm portion 36 are set as those of the diaphragm portion 24.

In order to make the sealed enclosure 20 by uniting the thus formed first and second case bodies 20, 30 to each other, a soldering paste 37 is first applied to the flange 32 of the second case body and then welded so that the flange 22 of the first case body 21 is united to the flange 32 of the second case body 30.

After the soldering work is completed and the working temperature becomes an ordinary temperature, sealing operations of the hole 25 are carried out by putting a solder ball B on the hole 25 of the diaphragm portion 24 of the first case body 21 (see FIG. 3). Reference sign B' designates a solder into which the solder ball B is melted. Since both the surfaces of the first and second case bodies 21, 30 are formed by beryllium copper plated with nickel, the soldering of the flanges 22, 32 or the hole 25 can be easily carried out.

The sealed enclosure 20 in which the hole 25 is closed is fixed within the plate part 11$a$ of the case 11 as shown in FIG. 1, In order to fix the sealed enclosure 20 within the plate part 11$a$ of the case 11, the flange 34 mounted on the second case body 30 is welded to the inner surface of the case 11 by, for example, spot welding. When the case 11 with the sealed enclosure 20 is caused to adhere tightly to the base 12, the sealed enclosure 20 is filled with silicon oil because the silicon oil can be put into a space between the base 12 and the case 11 by carrying out this operation in the silicon oil. At this time, the whole of the sealed enclosure 20 is effectively filled with the silicon oil 16 through the cutoff 35 formed in the flange 34.

Figure 5:
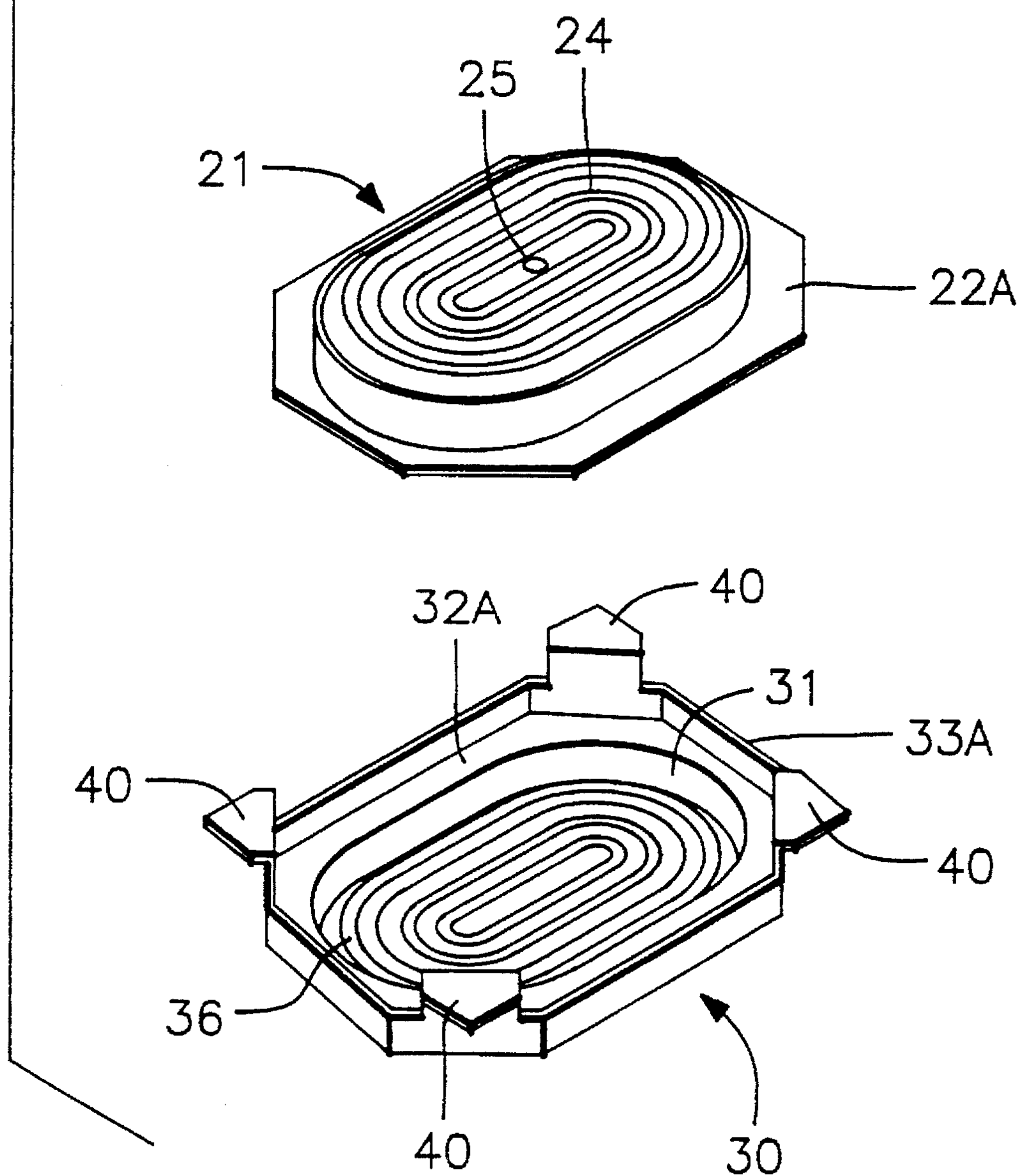
FIG. 5 is an explanatory view showing a second embodiment of the present invention.

In the above embodiment, the exterior of the sealed enclosure 20 has a rectangular shape. However, the invention is not limited to this. For example, as shown in FIG. 5, flanges 22A, 32A and a peripheral wall 33A may be each shaped like a polygon and, at the four corners of the second case body 30, leg portions 40 for fixing the sealed enclosure 20 to the inner surface of the plate part 11*a* of the case 11 by spot welding may be shaped like a hook.

As mentioned above, in the sealed enclosure 20, the peripheral wall 33 (33A) is formed around the flange 32 (32A) of the second case body 30, and the flange 22 (22A) which is fitted in the peripheral wall 33 and united to the flange 32 (32A) is formed in the first case body 21. Therefore, when the first and second case bodies 21, 30 are soldered together, the positioning of the first case body 21 with respect to the second case body 30 can be easily and certainly carried out, and thereby the efficiency of the fixation of the sealed enclosure 20 is raised and, in addition, a special tool for positioning it is not needed.

Further, since the peripheral wall 33 (33A) is formed in the second case body 30, when the sealed enclosure 20 is fixed to the inner surface of the plate part 11*a* of the case 11 by spot welding, the applied heat to the spot-welded leg portions 40 or the spot-welded flange 34 is difficult to be conducted to the soldering portion of the first and second case bodies 21, 30 because of the peripheral wall 33 (33A). Thereby, the solder by which the first and second case bodies 21, 30 are united to each other is prevented from re-melting and scattering. Accordingly, the reliability of the construction of the sealed enclosure 20 is raised.

According to the thermal expansion or contraction of the silicon oil 16, the diaphragm portions 24, 36 of the sealed enclosure 20 are deformed in the up or down direction from the positions shown in FIG. 1. Since the predetermined gap G is formed between the diaphragm 24 and the case 11 (the gap G is set so that, when the sealed enclosure 20 reaches a maximum in thermal expansion, the top of the sealed enclosure 20 is not brought into contact with the inner surface of the plate part 11*a* of the case 11), the diaphragm portion 24 can be smoothly deformed.

The deformation of the diaphragm portions 24, 36 brings about a compensation for a change in volume of the silicon oil 16. Therefore, the occurrence of drawbacks caused by the voluminous change is prevented. Accordingly, a volume of the case 11 is kept constant.

The thermal expansion or contraction of the silicon oil 16 causes only the deformation of the diaphragm portions 24, 36. Therefore, the generation of gas, as in the prior art, is prevented because there is no use of a sponge and no bubbles are generated in the silicon oil 16. Therefore, since the output characteristics of the acceleration detecting element 15 are not changed, an accurate acceleration can be detected.

Although the illustrated diaphragm portions 24, 36 of the sealed enclosure 20 are bent to have a shape resembling multiple waves in the above embodiments, the diaphragm portions 24, 36 need not be so bent if they are deformable. Further, the volume of the case 11 is not necessarily kept constant if a change in volume of the silicon oil 16 is to be compensated for.

What is claimed is:

1. In an acceleration sensor comprising an acceleration detecting semiconductor element for detecting acceleration in a sealed case and a liquid, with which said case is filled, for giving damping to said acceleration detecting semiconductor element, said acceleration sensor further comprising:

a sealed enclosure filled with gas and mounted in said case, said sealed enclosure having deformable diaphragm portions, said diaphragm portions extending in waves outwardly from their centers, a wave height of said diaphragm portions being gradually decreased outwardly;

a change in volume of said liquid caused by a change in temperature of said liquid being absorbed by deformation of said diaphragm portions.

2. An acceleration sensor according to claim 1, wherein said diaphragm portions are formed on surfaces of said sealed enclosure facing said case, and a gap is formed between said diaphragm portions and said case.

3. An acceleration sensor according to claim 1, wherein said sealed enclosure has a hole for adjusting internal pressure of said sealed enclosure, said hole being closed by a sealing member.

4. An acceleration sensor according to claim 3, wherein an inner surface of said hole is shaped like a taper gradually diminished in diameter toward the inside of said hole.

5. An acceleration sensor according to claim 1, wherein said sealed enclosure consists of a first case body and a second case body which are united to each other;

said first case body including a first container and a first flange, said first container having an opening at a lower end of said first container, said first flange being mounted around said opening; and said second case body including a second container, a second flange, and a wall, said second container having an opening at an upper end, said second flange being mounted around said opening of said second container and being united to said first flange, said wall with a predetermined height enclosing said second flange and extending toward said first case body.

6. An acceleration sensor according to claim 1, wherein said sealed enclosure has leg portions which are fixed to said case.

7. An acceleration sensor according to claim 1, wherein said sealed enclosure is made of beryllium copper, a surface of said sealed enclosure being plated with nickel.

8. In an acceleration sensor comprising an acceleration detecting semiconductor element for detecting an acceleration in a sealed case and a liquid, with which said case is filled, for giving damping to said acceleration detecting semiconductor element, said acceleration sensor further comprising:

a sealed enclosure filled with gas and mounted in said case, said sealed enclosure having deformable diaphragm portions, said diaphragm portions extending in waves outwardly from their centers, a wave pitch of said diaphragm portions being gradually decreased outwardly;

a change in volume of said liquid caused by a change in temperature of said liquid being absorbed by deformation of said diaphragm portions.

9. An acceleration sensor according to claim 8, wherein a wave height of said diaphragm portions gradually decreases outwardly.

* * * * *